(12) United States Patent
Kang et al.

(10) Patent No.: US 11,449,279 B1
(45) Date of Patent: Sep. 20, 2022

(54) PERFORMANCE OF A MULTI-CORE STORAGE SYSTEM

(71) Applicant: EMC IP Holding Company LLC, Hopkinton, MA (US)

(72) Inventors: Jianbin Kang, Beijing (CN); Geng Han, Beijing (CN); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/242,992

(22) Filed: Apr. 28, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ....................................................... G06F 3/06
See application file for complete search history.

(56) References Cited

U.S. PATENT DOCUMENTS 9,286,004 B1 * 3/2016 Puhov ................... G06F 3/0656

OTHER PUBLICATIONS

IP.com Prior Art Database Technical Disclosure, "Method and system to optimize virtualized systems on multi-core processor using performance monitor counters feedback loop", Dec. 1, 2010 (Year: 2010).*

* cited by examiner

*Primary Examiner* — Khoa D Doan
(74) *Attorney, Agent, or Firm* — Krishnendu Gupta; Deepika Bhayana; Derek Lam

(57) ABSTRACT

Techniques are used for improving performance of a storage system. The techniques may be used to provide, among other things, a set of counters for an object. Each counter corresponds to a unique processor in a multi-processor storage system. The state of a gate governing the object is determined. If the state of the gate is open, the counter corresponding to the first processor is incremented. The state of the gate for the object is re-determined. If the state of the gate remains open, the object is read and the counter corresponding to the first storage processor is decremented.

20 Claims, 8 Drawing Sheets

PERFORMANCE OF A MULTI-CORE STORAGE SYSTEM

BACKGROUND

Technical Field

This application concerns improving performance of multi-core storage systems, particularly when read and write requests are distributed across cores.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

To respond to a host request, the storage system determines the logical addresses corresponding to the data desired by the host. The storage system must determine the corresponding physical locations on disk to access the data. Moreover, the storage system may reserve storage for its own operations. Consequently, the storage system determines the logical addresses corresponding to the data needed for its processes, and determines the corresponding physical locations on disk to access the data.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method that includes establishing a set of counters for an object. Each counter corresponds to a unique processor in a multi-processor storage system. A request, for a first processor, to read the object is received. The method also includes determining a state of a gate governing the object. If the state of the gate is open, the counter corresponding to the first processor is incremented. The method further includes re-determining the state of the gate for the object. If the state of the gate remains open, the object is read and the counter corresponding to the first storage processor is decremented.

The method may also include decrementing the counter corresponding to the first storage processor if the re-determining of the state of the gate indicates the gate is closed, and repeating the step of determining the state of the gate of the object.

The method may further include receiving, for a second processor, a request to read the object. The state of the gate governing the object is determined. If the state of the gate is open, the counter corresponding to the second processor is incremented. The state of the gate for the object is re-determined, and if the state of the gate remains open, the object is read and the counter corresponding to the second storage processor is decremented.

The method may further include receiving, by a second storage processor, a request to write to the object. The state of the gate governing the object is determined. If the state of the gate is open, the gate is closed on behalf of the second storage processor. Upon determining that all of the requests to read the object have been completed, the second storage processor writes to the object.

Determining that all of the requests to read the object have been completed may be completed by determining that all of the counters for the object have reached zero. The values of all of the counters for the object may be continually compared to zero until all of the values become zero. Alternatively, the values of the counters may be added and the sum compared to zero. The values may continually be added and compared to zero until the sum of the values equals zero.

The method may include opening the gate upon completion of the writing of the object.

In some embodiments, the method may include repeating the step of determining the state of the gate of the object while the gate remains closed.

Another aspect of the current technique is a system with multiple processors. At least one processor is configured to establish a set of counters for an object. Each counter corresponds to a unique processor in the system. A processor may be configured to determine a state of a gate governing the object. If the state of the gate is open, the counter corresponding to the first processor is incremented. A processor may be configured to re-determine the state of the gate for the object. If the state of the gate remains open, the object is read and the counter corresponding to the first storage processor is decremented. The processors may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
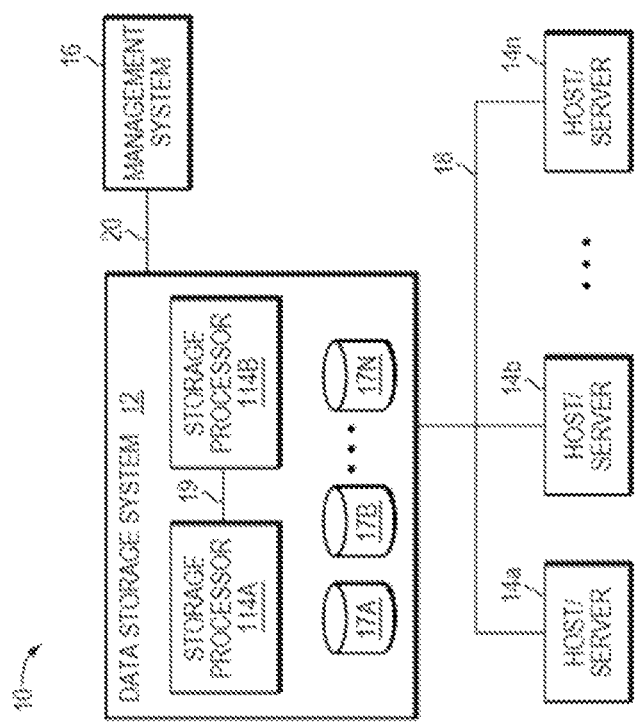
FIG. 1 depicts an example embodiment of a computer system 10 that may be used in connection with performing the techniques described herein.

Described below is a technique which may be used to provide, among other things, establishing a set of counters for an object, each counter corresponding to a unique processor in a multi-processor storage system; determining a state of a gate governing the object; if the state of the gate is open, the counter corresponding to the first processor is incremented; re-determining the state of the gate for the object; and if the state of the gate remains open, the object is read and the counter corresponding to the first storage processor is decremented.

Storage systems service data requests that can originate from, among other entities, hosts and operations within the storage systems themselves. Many of these requests may seek access to the same particular piece of data (also referred to herein as a "data object") and in a multi-core storage system, such requests may be distributed across the cores. Furthermore, any given core may receive multiple requests to access the same data object. Consequently, the storage system must coordinate all the read and write requests directed to the same data object, even though the cores generally operate independently of one another.

In some storage systems, a core that obtains address to a data object first puts a lock on the data object. As a result, no other cores can access the data object until the first core has completed its operation and unlocked the data object. The other cores continually check the state of the lock; in this manner, with respect to their requests for the data object, the cores spin until they are granted permission to lock the data object for themselves. Given the high frequency of read requests, such a configuration may adversely affect the performance of the storage system.

Exemplary embodiments of the solution described herein lock a data object so as to deny access only when a write request is being processed. Instead of a lock, as would be understood for conventional storage systems, a data object may be governed by a gate, and the gate is closed only when the data object is being written to. Thus, when a core seeks to process a read request, the core first checks whether the gate for the data object is open. If so, the core applies a read lock, reads the data object, and releases the read lock after completing its operation. In the mean time, other cores may also read the data object. In this manner, cores can simultaneously and independently read the data object to service their requests.

When a core seeks to process a write request, the core checks whether the gate for the data object is open. If the gate is open, the core closes the gate, thereby preventing downstream requests for the data object to be processed. Because multiple cores may be accessing the same data object at any given time, the core permits pending read requests to be finish running before it performs its write operation.

To achieve this objective, each core includes a counter corresponding to the data object. This counter is incremented whenever a core obtains access to the data object for a read request, and decremented when the read request is completed (since a core may receive multiple read requests for the data object, the counter may be incremented/decremented to account for each one). When a core closes the gate, the core checks the counters for the data object and does not perform its write operation until the counters across all of the cores are zero (0). Only then does the core write to the data object, and opens the gate to allow other accesses to the data object to resume.

In at least some implementations in accordance with the techniques as described herein, one or more of the following advantages can be provided: increased accessibility of objects to processes, and improved performance of requests on a multi-core storage system.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units (also referred to herein as "cores"). Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using Mode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
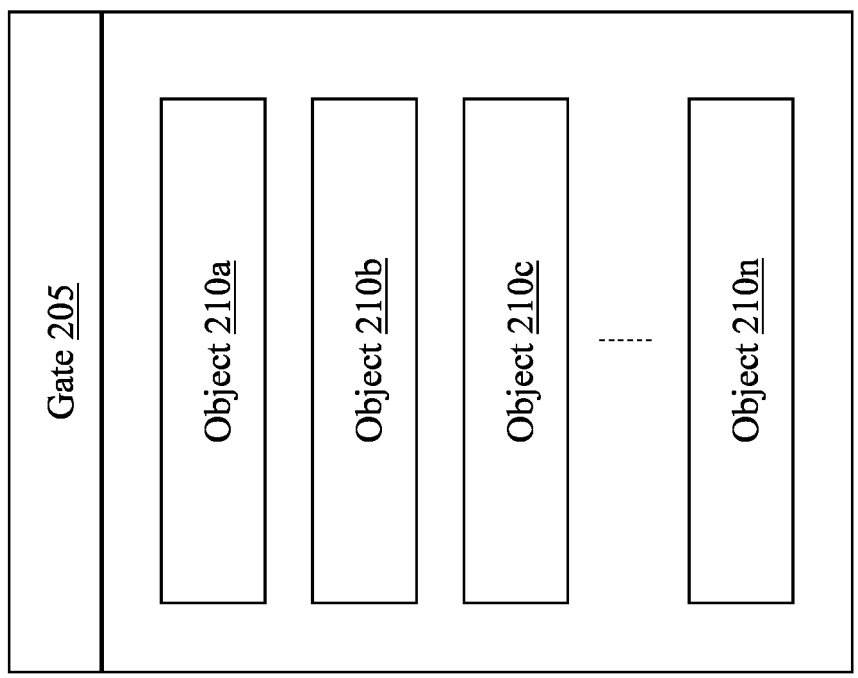
FIG. 2 is a schematic diagram of an arrangement of data governed by the same gate.

FIG. 2 is a schematic diagram of an arrangement of data governed by the same gate 205. In this embodiment, the storage system 12 has grouped together objects 210a-210n and assigned them to the same gate 205. The gate 205 determines whether or not any of the objects 210a-210n can be accessed, i.e., read or written to. Any of the storage processors 114 can check the status of the gate 205.

When the gate 205 is open, any of the storage processors 114 can access any of the objects 210a-210n. For example, upon determining the gate 205 is open, a storage processor 114a may be granted a read lock and allowed to read any of the objects 210a-210n. The storage processor 114a then accesses the particular object 210 desired. In the meantime, other storage processors 114 may check the gate 205 in a similar manner and likewise access the objects 210a-210n.

In some embodiments, a storage processor 114a may check the status of the gate 205 when seeking to write to an object 210a. If the gate 205 is open, the storage processor 114a may be granted a write lock that closes the gate 205. While the gate 205 remains closed, no other storage processor 114 can access any of the objects 210a-210n, regardless of which object 210a is being written to. After the write operation is completed, the gate 205 opens such that access to the objects 210a-210n can resume.

In this embodiment, the gate 205 governs access to a set of objects 210a-210n. The number in the set may vary, as would be appreciated by one of ordinary skill in the art. Moreover, the storage system 12 may organized the data assigned to the gate 205 according to any other configuration, beyond objects 210a-210n. Embodiments of the invention shall not be limited to the arrangements of data described herein.

Figure 3:
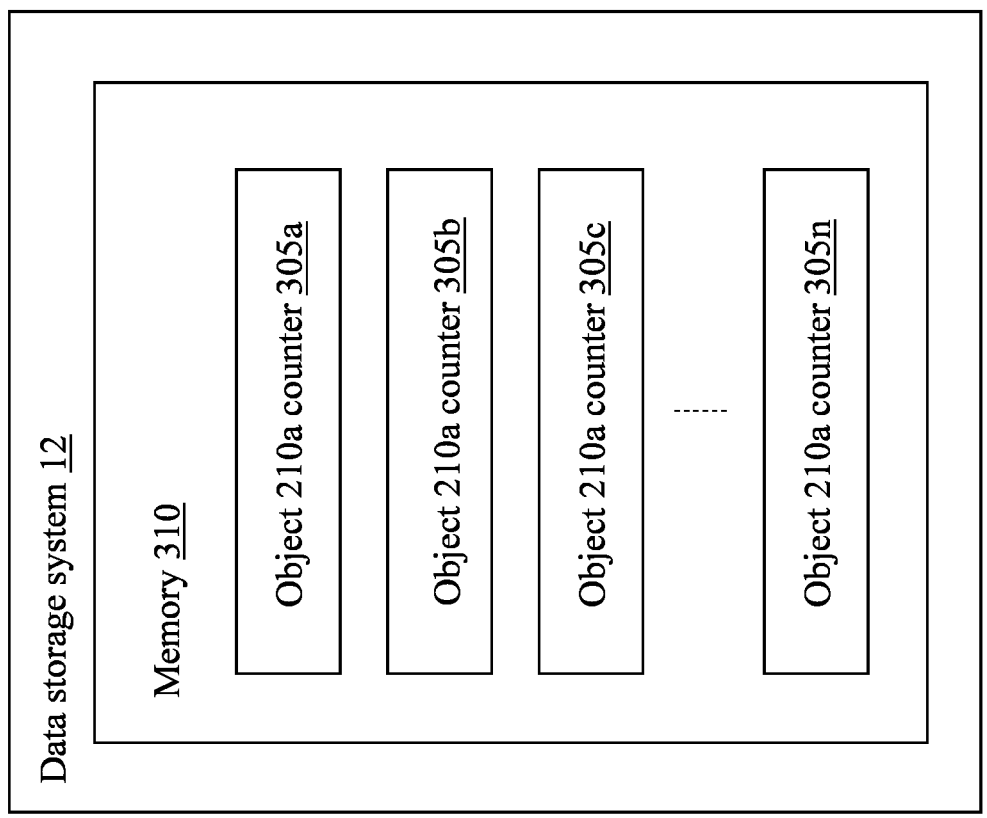
FIG. 3 is a schematic diagram of exemplary counters for an object stored by the storage system 12.

FIG. 3 is a schematic diagram of exemplary counters 305 for an object 210a stored by the storage system 12. In this embodiment, the counters 305a-305n (individually and collectively referred to herein as "305") are stored in memory 310, though in other embodiments, they may be stored on or among the storage devices 17a-17n. Each object 210a has a counter 305 corresponding to a different storage processor 114a-114n of the storage system 12. Thus, when the storage system 12 has "n" storage processors 114a-114n, there are also "n" counters 305a-305n for any given object 210a. All other objects 210b-210n will likewise have a corresponding set of counters 305a-305n, each counter 305 being associated with a different storage processor 114a-114n of the storage system 12.

Figure 4:
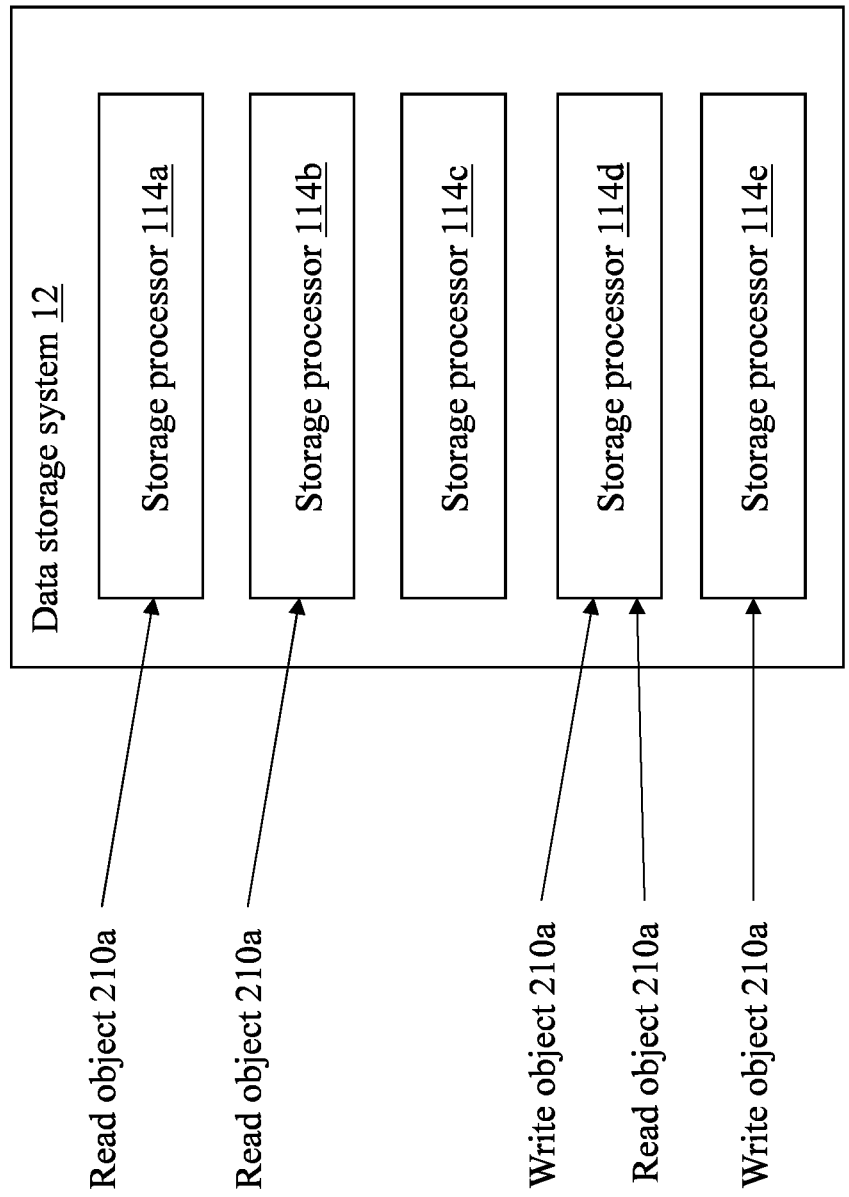
FIG. 4 is a schematic diagram of exemplary requests pertaining to the same object that may be received by the storage system and distributed across the storage processors.

FIG. 4 is a schematic diagram of exemplary requests pertaining to the same object 210a that may be received by the storage system 12 and distributed across the storage processors 114a-114e. In this example, storage processors 114a and 114b both receive requests to read object 210a. Storage processor 114d receives one request to write to the object 210a and another request to read the object 210a. Storage processor 114e receives a request to write to the object 210a. This set of I/O requests will be used to demonstrate exemplary operations contemplated by the inventors.

Figure 5:
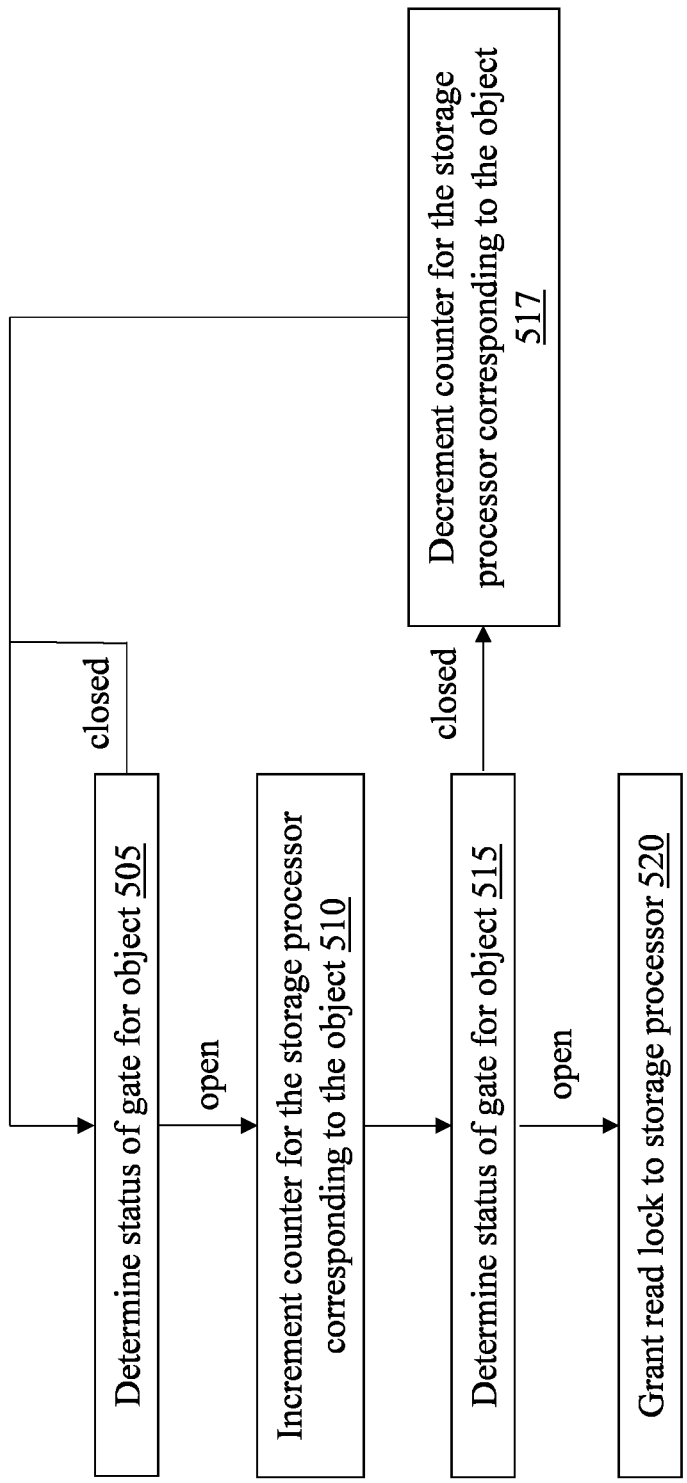
FIGS. 5-8 are exemplary flow diagrams for improving the performance of the storage system.

When the storage processor 114a receives the request to read the object 210a, the storage processor 114a may follow the exemplary steps of FIG. 5. The storage processor 114a may determine the status of the gate 205 for the object 210a (step 505). If the gate 205 is closed, one of the objects 210a-210n governed by the gate 205 is being written to, and the storage processor 114a must wait for this operation to be completed. Consequently, the storage processor 114a continues checking the gate 205 until it opens.

When the gate 205 is open, the storage processor 114a increments its counter 305a corresponding to the object 210a (step 510). In this manner, the counter 305a tracks the number of pending read requests for the object 210a associated with a particular storage processor 114a. Because another storage processor 114b-114n may have obtained a write lock while the counter 305a was being incremented, the storage processor 114a again determines the status of the gate 205 (step 515). If the gate 205 is closed, the counter 305a is decremented (step 517) and the storage processor 114a returns to checking the gate 205 until it is open again (step 505). However, if the gate 205 is open, the storage processor 114a obtains a read lock for the object 210a (step 520).

Figure 6:
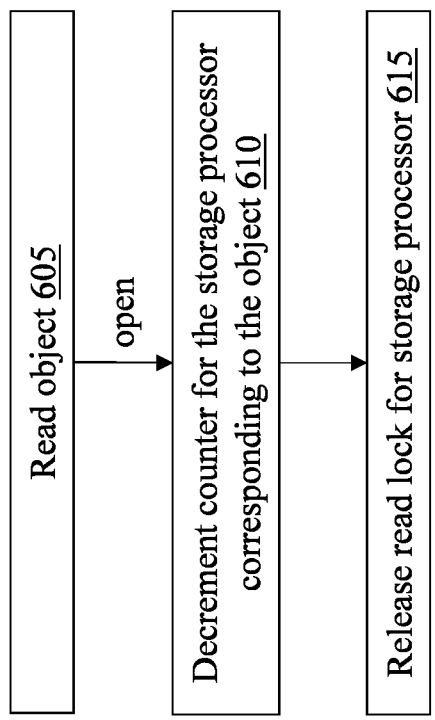

As shown in FIG. 6, the storage processor 114a reads the desired object 210a (step 605). Then, the counter 305a corresponding to the object 210a for the storage processor 114a is decremented (step 610), and the read lock for the storage processor 114a is released (step 615).

Figure 7:
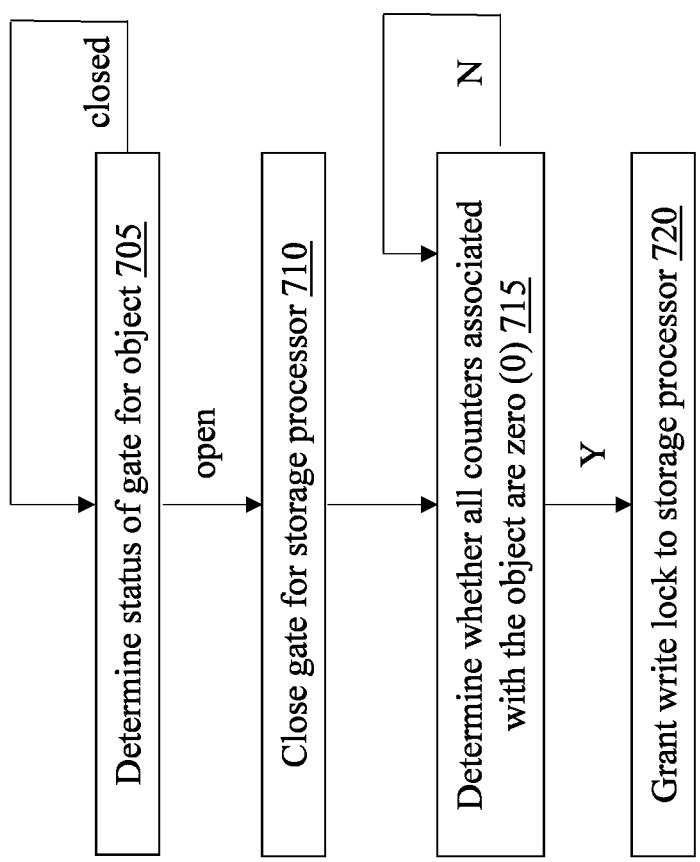

Returning to the exemplary I/O requests of FIG. 4, the storage processor 114b also receives a request to read object 210a, and it performs the same steps described in FIGS. 5-6. While these two requests are pending, storage processor 114d receives a request to write to the object 210a, and follows the exemplary steps of FIG. 7. The storage processor 114d determines the status of the gate 205 for the object 210a (step 705). In some situations, the object 210a or another object 210b-210n governed by the same gate 205 is already being written to, so the gate 205 is closed. Because only one storage processor 114a-114n may write to objects 210a-210n associated with a particular gate 205 at a time, the storage processor 114d continues checking the gate 205 until it is open.

When the gate 205 is open, the gate 205 may be closed for the storage processor 114d (step 710). In some situations, multiple storage processors 114 will be competing to write to an object 210a-210n governed by the gate 205, and one storage processor 114 will be given access while the others 114 continue to wait for a turn. Because other storage processors 114a-c, 114e-114n may have initiated read requests before the gate 205 closed, the storage processor 114d waits until those read requests have completed before writing to object 210a. The storage processor 114d may determine whether all counters 305a-305n associated with the object 210a are zero (0) (step 715). If any are non-zero, the storage processor 114d continues to check until this condition is met. As discussed above, when a read operation is completed, a storage processor 114 decrements its counter 305 associated with the object 210. In this manner, the storage processor 114d permits all read requests to the object 210a that are pending to be completed.

Figure 8:
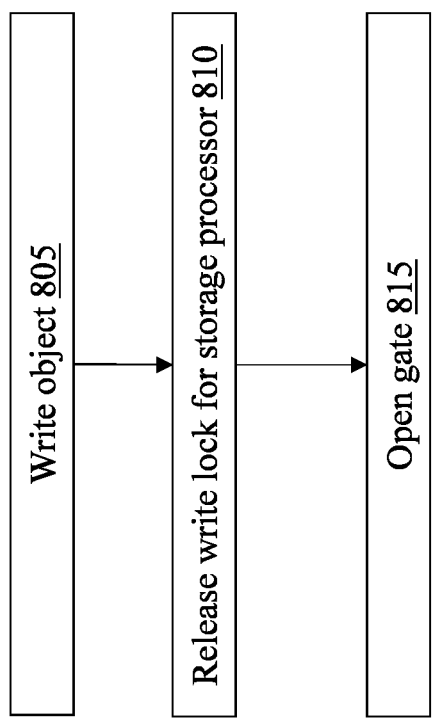

The storage processor 114d is granted a write lock to the object 210a (step 720). Then, as shown in FIG. 8, the storage processor 114d writes to the object (step 805). The write lock for the storage processor 114d is released (step 810), and the gate 205 is opened (step 815). As a result, all I/O requests for objects 210a-210n associated with the gate 205 may resume.

Returning to the exemplary I/O requests of FIG. 4, the storage processor 114d may receive a read request for the object 210a after receiving the write request. Because the write request already resulted in the gate 205 being closed, the subsequent read request storage processor 114d must wait. With respect to this request, the storage processor 114d remains in step 505 of FIG. 5, checking the status of the gate 205 until the gate 205 opens. When the write request is completed and the gate 205 re-opens, the storage processor 114d may proceed and increment the counter 305a corresponding to the object 210a (step 510), followed by the subsequent steps explained in FIG. 5.

In the exemplary I/O requests of FIG. 4, the storage processor 114e receives a write request for object 210a after storage processor 114d receives its write request. In this example, the gate 205 is already closed because the storage processor 114e received its write request earlier. However, in other embodiments, the two storage processors 114d, 114e may compete for the same gate 205, and one is granted the gate 205 over the other such that the other must wait until the gate 205 is open. In some embodiments, write requests to the same object 210a are added to a queue. When storage processor 114d finishes its write request so as to re-open the gate 205, storage processor 114e may have the gate 205 closed on its behalf, as in step 710 of FIG. 7. The storage processor 114e then proceeds to allow all pending read requests for object 210a to complete (step 715) before writing to the object 210a, and continues with the remaining steps described in FIG. 7 and beyond.

In an alternative embodiment, one storage processor 114 runs a lock operation and increments its corresponding counter, but a different storage processor 114 unlocks the same operation and decrements its corresponding counter. In this embodiment, when the gate 205 is closed to enable a write operation, the storage processor 114 does not wait for the counters 305 for the object to reach zero (0). Instead, the storage processor 114 continually adds the counters 305 across the storage processors 114 and waits until this sum reaches zero (0).

In an exemplary use case of the solution described herein, the storage system 12 may include RAID. In the course of RAID's operations, uber objects may need to be frequently accessed to complete I/O requests. Background monitors require access to the same objects, but on a less frequent basis. For example, to service a read request, RAID must map the requested data to its location on disk. A storage processor may obtain a read lock of the uber object corresponding to the requested data, and read the uber geometry and uber metadata. Using the solution described herein, because the gate for the object remains open, other read requests to the same object, whether serviced by the same storage processor or others in the storage system, may be completed in parallel. In light of the high volume of read requests, the ability to accomplish multiple read requests in parallel greatly improves the performance of the storage system.

In situations that are rare, relative to the frequency of I/O read requests, background monitors will need exclusive access to uber objects to modify them. For example, a drive may fail or a broken drive slice may be replaced with a reserved spare slice. In the first situation, the uber metadata must be updated to mark the uber corresponding to the failed drive as degraded, and in the second situation, the uber geometry must be updated. The storage processor(s) running the background monitor ensures the gate to the object(s) corresponding to the uber metadata or uber geometry is closed on its behalf, enables existing read requests to complete, and updates the uber metadata or geometry. Because the events triggering such write requests are relatively rare, the overall impact on the performance of the storage system is modest.

In another exemplary use case of the solution described herein, the storage system 12 may be a distributed system with multiple nodes. The storage system 12 runs an internal communication service (ICS), through which the nodes communicate among themselves to exchange information about their states. A node within the storage system 12 may store an object with information about its state (also referred to herein as the "state object"). Each storage processor on the node may continually run a poller that checks the value of the state object. Thus, all the storage processors are continually and simultaneously reading the state object. When the node becomes unavailable, one storage processor may run an ICS service shutdown process, which updates the state object to indicate the node is disabled. Thus, the storage processor ensures the gate to the state object is closed on its behalf, enables existing read requests to complete, and updates the state object.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:
   establishing, for an object, a set of counters, each counter corresponding to the object and a unique processor in a multi-processor storage system;
   receiving, for a first processor, a request to read the object;
   determining a state of a gate governing the object;
   if the state of the gate is open, incrementing the counter corresponding to the first processor;

re-determining the state of the gate for the object;
if the state of the gate remains open, reading the object and decrementing the counter corresponding to the first storage processor.

2. The method of claim 1, further comprising:
decrementing the counter corresponding to the first storage processor if the re-determining of the state of the gate indicates the gate is closed; and
repeating the step of determining the state of the gate of the object.

3. The method of claim 1, further comprising:
receiving, for a second processor, a request to read the object;
determining the state of the gate governing the object;
if the state of the gate is open, incrementing the counter corresponding to the second processor;
re-determining the state of the gate for the object;
if the state of the gate remains open, reading the object and decrementing the counter corresponding to the second storage processor.

4. The method of claim 1, further comprising:
receiving, for a second storage processor, a request to write to the object;
determining the state of the gate governing the object;
if the state of the gate is open, ensuring the gate is closed on behalf of the second storage processor;
determining that all of the requests to read the object have been completed; and
writing to the object.

5. The method of claim 4, wherein determining that all of the requests to read the object have been completed comprises:
determining that all of the counters for the object have reached zero.

6. The method of claim 5, wherein determining that all of the counters for the object have reached zero comprises:
continually comparing values of all of the counters for the object to zero until all of the values become zero.

7. The method of claim 4, wherein determining that all of the requests to read the object have been completed comprises:
adding values of all of the counters for the object;
comparing the sum of the values to zero.

8. The method of claim 7, further comprising:
repeating the steps of adding and comparing until the sum of the values of all of the counters equals zero.

9. The method of claim 4, further comprising:
upon completion of the writing of the object, opening the gate.

10. The method of claim 4, further comprising:
if the determining of the state of the gate indicates the gate is closed, repeating the step of determining the state of the gate of the object.

11. A system comprising at least one processor configured to:
establish, for an object, a set of counters, each counter corresponding to the object and a unique processor in a multi-processor storage system;
receive, for a first processor, a request to read the object;
determine a state of a gate governing the object;
if the state of the gate is open, increment the counter corresponding to the first processor;
re-determine the state of the gate for the object;
if the state of the gate remains open, read the object and decrement the counter corresponding to the first storage processor.

12. The system of claim 11, wherein the at least one processor is further configured to:
decrement the counter corresponding to the first storage processor if the re-determination of the state of the gate indicates the gate is closed; and
continue to determine the state of the gate of the object.

13. The system of claim 11, wherein the at least one processor is further configured to:
receive, for a second processor, a request to read the object;
determine the state of the gate governing the object;
if the state of the gate is open, increment the counter corresponding to the second processor;
re-determine the state of the gate for the object;
if the state of the gate remains open, read the object and decrement the counter corresponding to the second storage processor.

14. The system of claim 11, wherein the at least one processor is further configured to:
receive, for a second storage processor, a request to write to the object;
determine the state of the gate governing the object;
if the state of the gate is open, ensure the gate is closed on behalf of the second storage processor;
determine that all of the requests to read the object have been completed; and
write to the object.

15. The system of claim 14, wherein the at least one processor is further configured to:
determine that all of the counters for the object have reached zero.

16. The system of claim 15, wherein the at least one processor is further configured to:
continually compare values of all of the counters for the object to zero until all of the values become zero.

17. The system of claim 14, wherein the at least one processor is further configured to:
add values of all of the counters for the object;
compare the sum of the values to zero.

18. The system of claim 17, wherein the at least one processor is further configured to:
continue to add the values of all of the counters and compare the sum until the sum equals zero.

19. The system of claim 14, wherein the at least one processor is further configured to:
upon completion of the writing of the object, open the gate.

20. The system of claim 11, wherein the at least one processor is further configured to:
repeat the step of determining the state of the gate of the object while the gate remains closed.

* * * * *